United States Patent
Rao et al.

(10) Patent No.: US 7,337,248 B1
(45) Date of Patent: Feb. 26, 2008

(54) ADAPTIVE SYNCHRONIZATION METHOD FOR COMMUNICATION IN STORAGE SYSTEMS

(75) Inventors: Raghavendra J P Rao, Fremont, CA (US); Sanjay Singh, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 645 days.

(21) Appl. No.: 10/805,110

(22) Filed: Mar. 19, 2004

(51) Int. Cl.
  *G06F 13/00* (2006.01)
  *G06F 3/00* (2006.01)
  *G06F 13/38* (2006.01)
  *G06F 13/40* (2006.01)

(52) U.S. Cl. .......................... 710/53; 710/57; 710/52; 710/5; 710/6

(58) Field of Classification Search ............ 710/52–57, 710/5, 6
See application file for complete search history.

(56) References Cited

U.S. PATENT DOCUMENTS

| | | | |
|---|---|---|---|
| 5,671,365 A * | 9/1997 | Binford et al. | 710/100 |
| 6,421,723 B1 * | 7/2002 | Tawil | 709/224 |
| 7,111,301 B1 * | 9/2006 | Johnson et al. | 710/52 |

* cited by examiner

*Primary Examiner*—Kim Huynh
*Assistant Examiner*—Joshua D. Schneider
(74) *Attorney, Agent, or Firm*—Martine Penilla & Gencarella, LLP

(57) ABSTRACT

A method for transferring data in a storage system is provided. The method includes setting a catch-up threshold for accepting data requests from a port where the queue value corresponds to a number of requests collected from an input queue for every CPU interrupt, and the input queue receives requests from the port and stores the requests to be collected by a CPU. The method also includes adjusting the catch-up threshold to reduce an imbalance between the number of requests made to the input queue and a number of requests made to an output queue in a particular period of time where the output queue receives requests from the CPU and stores the requests to be gathered by the port.

21 Claims, 13 Drawing Sheets

ADAPTIVE SYNCHRONIZATION METHOD FOR COMMUNICATION IN STORAGE SYSTEMS

BACKGROUND OF THE INVENTION

1. Field of the Invention

The present invention relates to system the internal data movement within a system and more particularly, to the use of adaptive synchronization in storage systems.

2. Description of the Related Art

In modern computer systems, a storage system typically has an external interface that consists of a storage interconnect chip running a relatively small amount of firmware or microcode. Higher level software executed by a central processing unit (CPU) of the storage system manages the interconnect chip. This chip has the primary responsibility of enabling and interfacing with the external connectivity to a host from the storage system. The high level software running inside the storage system interacts with the interconnect chip to receive incoming commands, perform data transfers, and receive status notifications.

The storage interconnect chips are experiencing tremendous demands in regards to the speed of the link provided by the interconnect chips between the host and the storage system. In order to be able to operate at the interconnect chip's maximum capability, the communication between the interconnect chip and the higher level software running in the CPU of the storage system needs to be very efficient, otherwise the overall performance of the storage system suffers. Unfortunately, current techniques in interfacing the higher level system software and the interconnect chip fall short of meeting the increasingly demanding input/output (I/O) requirements at higher link speeds. Studies have shown that the synchronization mechanisms currently used between the system software and the interconnect chip cause considerable delays as discussed in more detail below.

FIG. 1 illustrates a standard storage sub-system 10. The storage sub-system 10 provides a communication path between storage area network (SAN) 18 and storage devices 22a and 22b. Interconnect chips 12 and 14, also referred to as a front end port and a back end port, respectively, are in communication with CPU 16. The front end port 12 is in communication with a storage area network (SAN) 18, which in turn communicates with the hosts 20a and 20b. The back end port 14 is in communication with storage devices 22a and 22b.

Typically, the communication protocol between the system software executed by the CPU 16 is configured such that for each command or status notification sent from the front end port 12 to the CPU 16, the CPU 16 is interrupted. This configuration holds true for communication from the back end port 14 to the CPU 16. It should be appreciated that interrupts for each and every command or status notification can be taxing when there are a large number of commands to be processed. Consequently, for every data transfer request there may be two interrupts generated (e.g., one interrupt for the command arrival and one interrupt for the status notification). Such an overload of interrupts can greatly reduce the I/O throughput. Thus, where interrupts exist for each and every command all other activity within the system is stalled as the interrupt handler is continually pulling out incoming commands. Another technique for managing the interrupts, collects as many commands and status notifications as possible and then interrupts the CPU to process all of the collected commands and status notifications. Collecting as many commands and status notifications leads to excessive bursts in performance of the storage system, not to mention the burden placed on the software for the collection and bundling of the commands and status notifications. In either case, the interrupts used are excessive either in quantity or the amount of time spent processing them, therefore, the system does not transfer data at a maximum or near maximum capability.

Another shortcoming of the configuration of FIG. 1 is that the communication channels between front end port 12 and the CPU 16 are not intelligently utilized. For example, where a maximum amount of commands are collected for the CPU 16, an interrupt is issued for the CPU to pick up the collected commands. However, front end port 12 is unable to post additional commands until the front end port receives notification that the CPU 16 has completed processing of all of the collected commands. Accordingly, the latency of the system is adversely impacted from this scheme.

In view of the foregoing, there is a need for a more efficient method of communication between the CPU/software and the interconnect chip (e.g., front end port, back end port) that maximizes the I/O throughput to the full capability of the interconnect chip.

SUMMARY OF THE INVENTION

Broadly speaking, the present invention fills these needs by providing a scheme for adaptively synchronizing the communication between a port of the interconnect chip and the software being executed by a processor. The present invention can be implemented in numerous ways, including as a process, an apparatus, a system, a device, or a method. Several embodiments of the present invention are described below.

In one embodiment, a method for accepting requests in a storage system is provided. The method includes setting a catch-up threshold for accepting data requests from a first port where the catch-up threshold corresponds to a number of requests collected from a first queue for each CPU interrupt. The first queue is configured to receive requests to the first port and stores the requests to be collected by a CPU. The method also includes adjusting the catch-up threshold to reduce an imbalance between the number of requests made to the first queue and a number of requests made to a second queue during a time period where the second queue receives and stores requests from the CPU to the first port.

In another embodiment, a method for transferring data in a storage system with a CPU for communicating with at least one port is provided. The method includes monitoring data being transferred between a front end port and a back end port through a central processing unit. The method also includes determining whether a data transfer queue is running at an equivalent transfer rate as the command queue, and adjusting a catch-up threshold to reduce an imbalance between a number of writes to the command queue and a number of writes to the data transfer queue.

In yet another embodiment, a computer readable medium with program instructions for transferring data in a storage system is provided. The computer readable medium includes program instructions for setting a catch-up threshold for accepting data requests from a first port where the catch-up threshold corresponds to a number of requests collected from a first queue for each CPU interrupt where the first queue receives requests to be collected by a CPU. The computer readable medium further includes program instructions for adjusting the catch-up threshold to reduce an imbalance between the number of requests made to the first queue and a number of requests made to a second queue in a time period where the second queue is configured to receive requests from the CPU and to store the requests to be collected by the first port.

In still yet another embodiment, a storage sub-system providing access to stored data is provided. The storage sub-system includes a first port providing access to a host requesting data. The first port includes a first port catch-up queue. The first port catch-up queue is configured to store Input/Output (I/O) transactions associated with read and write requests from the host, wherein an amount of I/O transactions posted to the first port catch-up queue at a time is controlled by a first port catch-up threshold. A second port providing access to the stored data and a central processing unit (CPU) in communication with the first port and the second port are included. The central processing unit is configured to process the amount of I/O transactions per a single interrupt. A cache memory configured to store the stored data being accessed through the second port is included.

The advantages of the present invention are numerous. Most notably by enabling adaptive synchronization between the communication ports, and the software managing the interconnect chip, an increase in the data transfer efficiency, as well increased overall I/O throughput in data storage systems, may be achieved. Yet another advantage is the applicability of the adaptive synchronization scheme regardless of whether the storage system is in communication with the host (via Front End Ports), or the disk drives (via Back End Ports). That is, software executed by a CPU may synchronize with a front end port or a back end port by updating the number of commands or status notifications processed, through the adjustment of a catch-up threshold as described herein. The embodiments described below can be iteratively applied at the storage system level to provide balance between front-end and back-end activity, as opposed to balancing the front-end activities or back-end activities as stand-alone entities.

Additionally, the CPU and the interconnect chip may be operating on a command queue simultaneously. For example, the CPU may be pulling out commands from the updated entries in the command queue, while the front end port is posting more commands in the available entries of the command queue. The use of an adaptive catch-up threshold enables the optimization of the throughput for the communication channel. As a result, a more efficient and cost effective data transfer system becomes possible.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Figure 1:
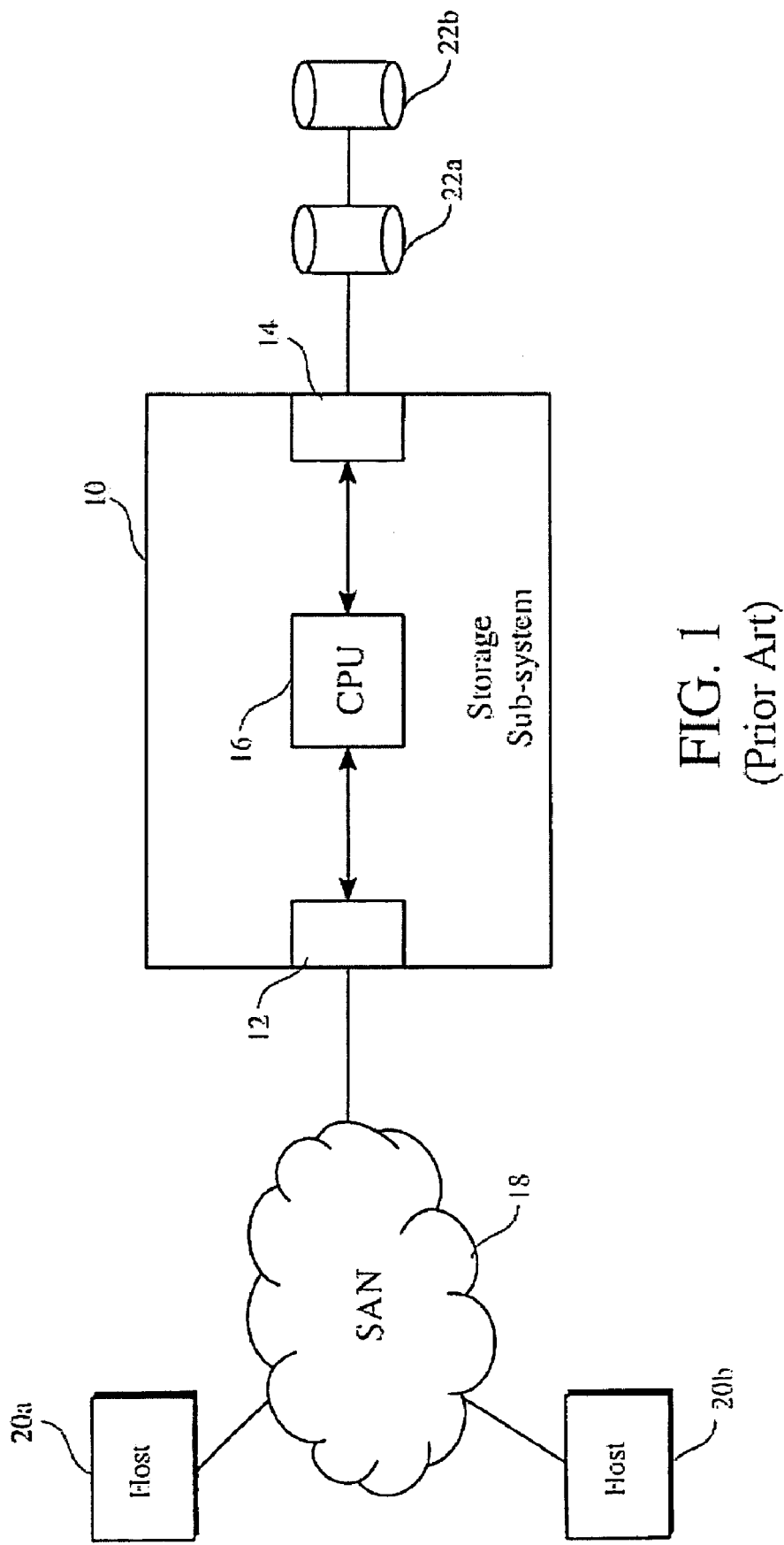
FIG. 1 illustrates a standard storage sub-system.

An invention is disclosed for utilizing adaptive synchronization for communication between a port (e.g., front end port or back end port) and software being run by a CPU. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

It should be appreciated that the two end-points of the communication are the system software running in the CPU and interconnect chip (either running a small microcode program or none at all). These two end-points need to be in-sync with the number of requests sent/received, responses sent/received, status updated/notified, etc. This synchronization is achieved through the embodiments described below.

In one embodiment of the present invention, a front end port of a storage system sends a data retrieval request to the CPU through a command queue located in the front end port. The CPU then sends a data request to a back end port to access the data requested by the front end port and places the data in the cache. The CPU sends data pointers to a data transfer queue of the front end port indicating where in the cache the data is located. The front end port can then use direct memory access (DMA) to pull data from the locations in the cache indicated by the data pointers. A completion notification indicating the data has been transferred successfully is sent from a completion queue of the front end port. In one embodiment, the command queue may deliver completion notifications to the CPU, instead of a separate completion queue, i.e., the command queue and the completion queue are combined in the front end port since the communication direction (from the interconnect chip to the CPU) is the same for the command queue and the completion queue. The CPU then sends an acknowledgement notice to a status queue of the front end port. The status queue and data transfer queue may be combined in one embodiment. It should be understood that the CPU and the back end port may communicate in a similar manner where the CPU requests data from the back end port through a command queue of the back end port. A data transfer queue of the back end port contains data pointers indicating where in the memory space of the cache the corresponding data has been stored.

In one embodiment, the method described herein includes monitoring the performance of the system with regard to the overall balance in terms of processing of the incoming commands, responding to these commands with data transfers, and processing status completions. Monitoring the performance of the system includes collecting events such as the number of interrupts, number of requests processed per interrupt, amount of time spent per interrupt, amount of data transferred per command, etc. Based upon statistics generated from the collected events, such as the balance between requests made to corresponding queues, and tracking the amount of time taken by the interrupt thread in the operating system, the embodiments described herein reactively apply the collected results to effectively balance various tasks. These collected statistics, are reactively applied to balance the overall flow as well as improve utilization of the CPU, thereby maximizing interconnect chips ability and link bandwidth. As mentioned above, the I/O processing in each port involves, receiving the incoming commands in a command queue (between chip and software), setting up data transfers in a data transfer queue (between software and chip) and receiving status completions in a completion queue (between chip and software). The method also includes determining whether all these queues are running at equivalent transfer rates and adjusting a catch-up threshold for command processing to reduce an imbalance between a number of I/O requests to the command queue and a number of data transfers to the data transfer queue.

Therefore, an interconnect chip such as, for example, an interconnect chip located in a front end port or a back end port, may be synchronized with software in the CPU in a dynamic manner. When the software is first notified (via an interrupt), the software can determine how many commands or status notifications need to be processed. After processing a number such as, for example, $1/4^{th}$, $1/8^{th}$, or some other suitable fraction, of the total commands or status notifications outstanding, the software may synchronize with the interconnect chip by updating the number of commands or status notifications to be processed. The software continues to keep track of the total number of commands and status notifications processed and when this number reaches the updated number (referred to as the catch-up threshold), the software returns control, thereby enabling the CPU in the system to be used for other functions. This synchronization enables the interconnect chip to receive and post more commands or status notifications to the software and at the same time, the software can process as many of the commands and status notifications without having to take another interrupt. Thus, the CPU is enabled to process other critical functions. As will be explained further below, the embodiments described herein provide a more efficient data movement scheme where the efficiencies cascade through the entire system so that data may be moved in a manner causing the least amount of interrupts and the lowest latency. The term "I/O transactions" as used herein refers to commands and/or status notifications.

Figure 2:
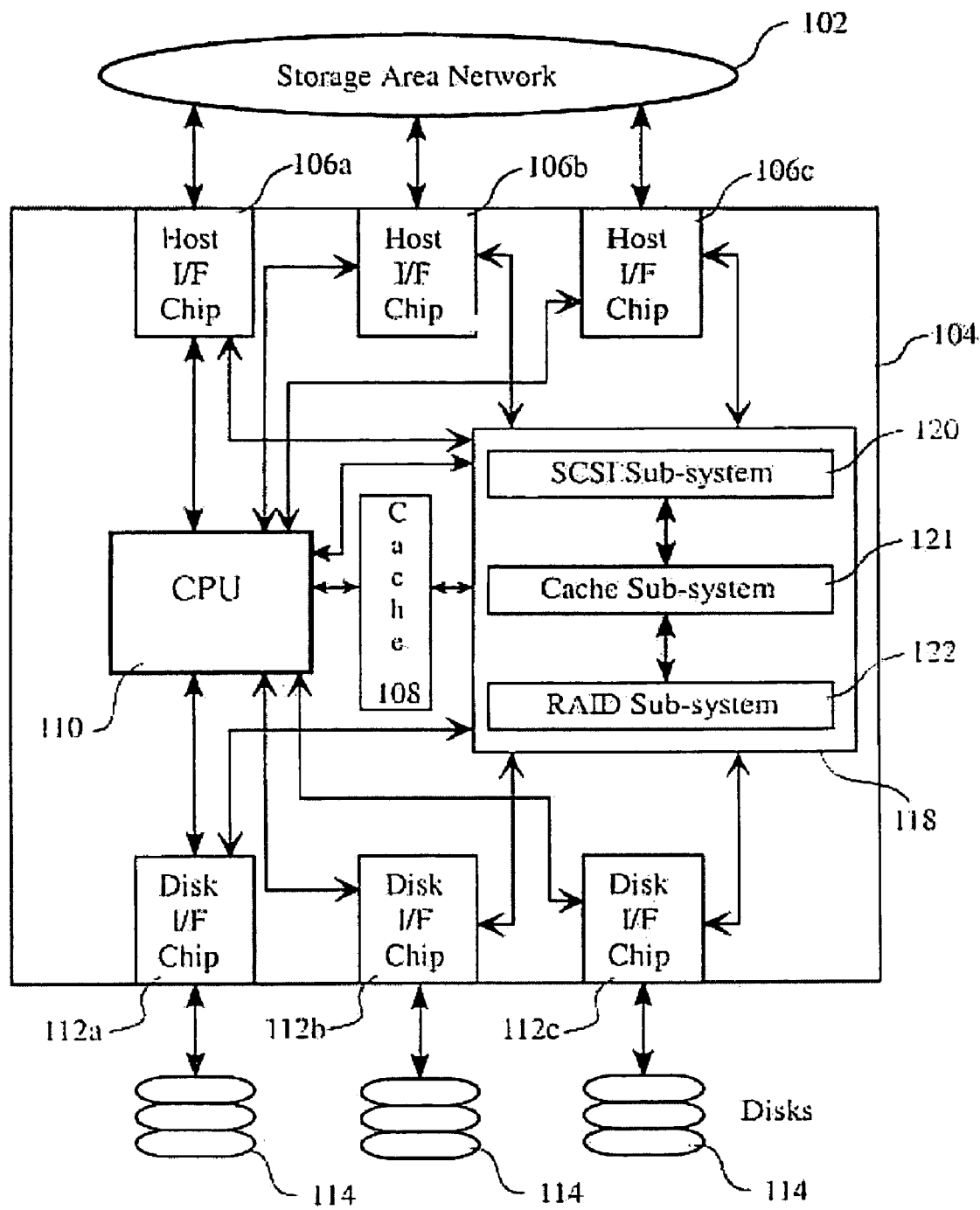
FIG. 2 is a simplified schematic diagram illustrating a storage sub-system 104 in accordance with one embodiment of the present invention.

FIG. 2 is a simplified schematic diagram illustrating a storage sub-system 104 in accordance with one embodiment of the present invention. The storage sub-system 104 includes a CPU 110 that is capable of communicating with a cache 108, disk I/F chips 112a-c, and host I/F chips 106a-c. In one embodiment, the CPU 110 is in communication with sub-system code 118, which includes SCSI sub-system code 120, cache sub-system code 121, and a RAID sub-system code 122. The host I/F chips 106a-c interface with a storage area network (SAN) 102 and the disk I/F chips 112a-c interface with disks 114. One skilled in the art will appreciate that each of SCSI sub-system code 120, cache sub-system code 121, and RAID sub-system code 122 represent code which may be stored in a read only memory or a programmable read only memory. In addition, sub-system code 118 may be a programmable logic device, e.g., a field programmable gate array. Alternatively, sub-system code 118 may be stored in memory 140 (Shown in FIG. 3). It should be appreciated that the connections for the components illustrated in FIG. 2 are logical connections.

The SCSI sub-system code 120 receives and processes a command which originates from one of the host I/F chips 106a-c. Then the cache sub-system code 121 performs a lookup in the cache 108 to see where data is to be placed and responds to the command. The redundant array of inexpensive disks (RAID) sub-system code 122 receives the disk requests for communication with an internal drive and processes disk drive access and data transfer. The CPU 110 communicates with each of the sub-systems to transfer data in an optimized manner in accordance with the methodology as described herein. It will be apparent to one skilled in the art that the RAID sub-system may be implemented in hardware as well as software.

In one embodiment, the storage sub-system 104 utilizes the methods of adaptive synchronization as described herein. In such an embodiment, the sub-system code 118 executed by the CPU 110 may be synchronized with the host interface chips 106a-c and disk interface chips 112a-c to substantially eliminate bottlenecks associated with data transfer. Therefore, the data rate being used to transmit data through the host interface chips 106a-c and disk interface chips 112a-c may be synchronized with the data being received.

Figure 3:
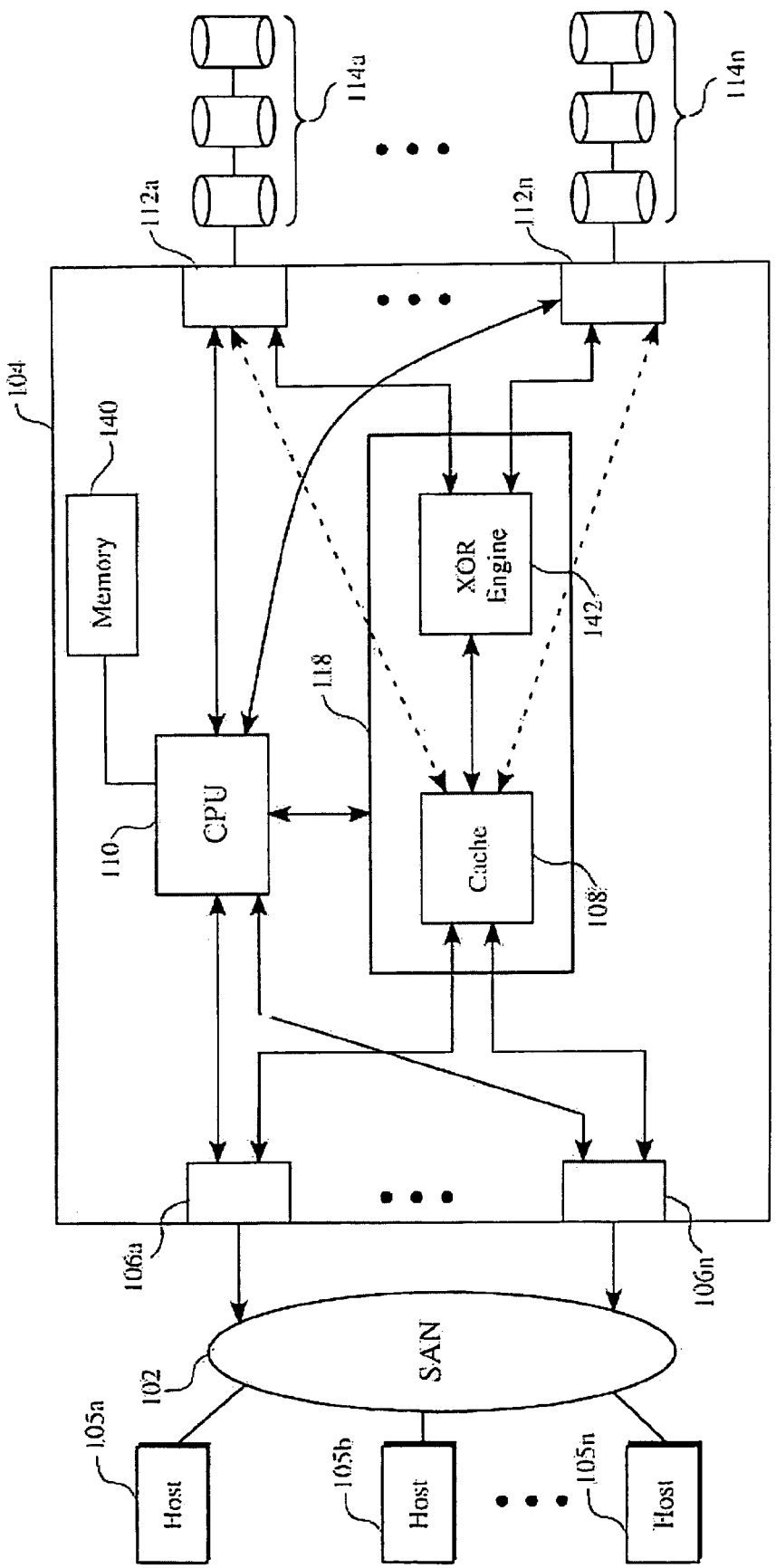
FIG. 3 illustrates a detailed diagram of a storage sub-system in accordance with one embodiment of the present invention.

FIG. 3 illustrates a detailed diagram of a storage sub-system in accordance with one embodiment of the present invention. Storage sub-system 104 includes a CPU 110 capable of communicating with system memory 140 and memory cache 108. CPU 110 communicates with front end ports 106a through 106n (which are equivalent to host I/F chips 106a-c with reference to FIG. 2) as well as back end ports 112a through 112n (which are equivalent to disk I/F chips 112a-c with reference to FIG. 2). It should be understood that any suitable number of front end ports and back end ports may be utilized depending on the number of hosts and storage devices to be connected to the storage system. The cache 108 communicates with an XOR engine 142 if storage devices 114a through 114n are configured as a RAID. One skilled in the art will appreciate that XOR engine 142 may be implemented in software as depicted in FIG. 3. Alternatively, XOR engine 142 may be implemented as circuitry in a RAID controller chip. In one embodiment, each of the back end ports 112a through 112n is connected with storage devices 114a through 114n, respectively. It should be appreciated that the storage devices 114a through 114n may be any suitable type(s) of storage apparatuses such as, for example, RAID devices, hard disk drives, floppy drives, CD-Rs, CD-RWs, memory sticks, etc. In one embodiment, the front end ports 106a through 106n are in communication with hosts 105a through 105n, respectively, through a storage area network (SAN) 102. It should be further appreciated that any suitable type of networking protocol may enable communication between the front end ports 106a through 106n with the hosts 105a through 105n. The cache 108 is utilized as an intermediary storage location to transfer data between the back end ports 112a through 112n and the front end ports 106a through 106n.

In another embodiment, any of the front end ports 106a-n can send requests to the CPU 110 through a command queue, which is located in each of the front end ports 106a-n. It should be appreciated that a "queue" as utilized herein may be any suitable type of memory that can store data, e.g., a first-in first-out (FIFO) buffer. The CPU 110 can then pull the data that is requested from the back end port and put the data into the cache memory 108. Because the CPU 110 has access to the location of the data stored in the cache memory 108, the CPU 110 can send data pointers to a data transfer queue of the corresponding front end port (which is requesting the data) indicating where the data is located. The respective front end port can then use direct memory access (DMA) to pull data from the locations in the cache 108 as indicated by the data pointers. The front end port then sends an acknowledgement through a completion queue to the CPU 110 indicating that data has been transferred successfully. The CPU 110 then sends an acknowledgement notice to a status queue of the front end port. It will be apparent to one skilled in the art that each of the queues discussed herein are contained in the corresponding front end or back end port. Of course, the back end ports 112a through 112n and the front end ports 106a through 106n may communicate with memory 140 through CPU 110.

FIGS. 4A through 4E are simplified schematic diagrams illustrating the adaptive synchronization scheme being implemented through the use of a catch-up queue. The catch-up queue is utilized for communication between the front end port and the CPU, however, the invention is not limited to this embodiment. One skilled in the art will appreciate that the catch-up queue may also be utilized to facilitate communication between the CPU and the back end port.

Figure 4A:
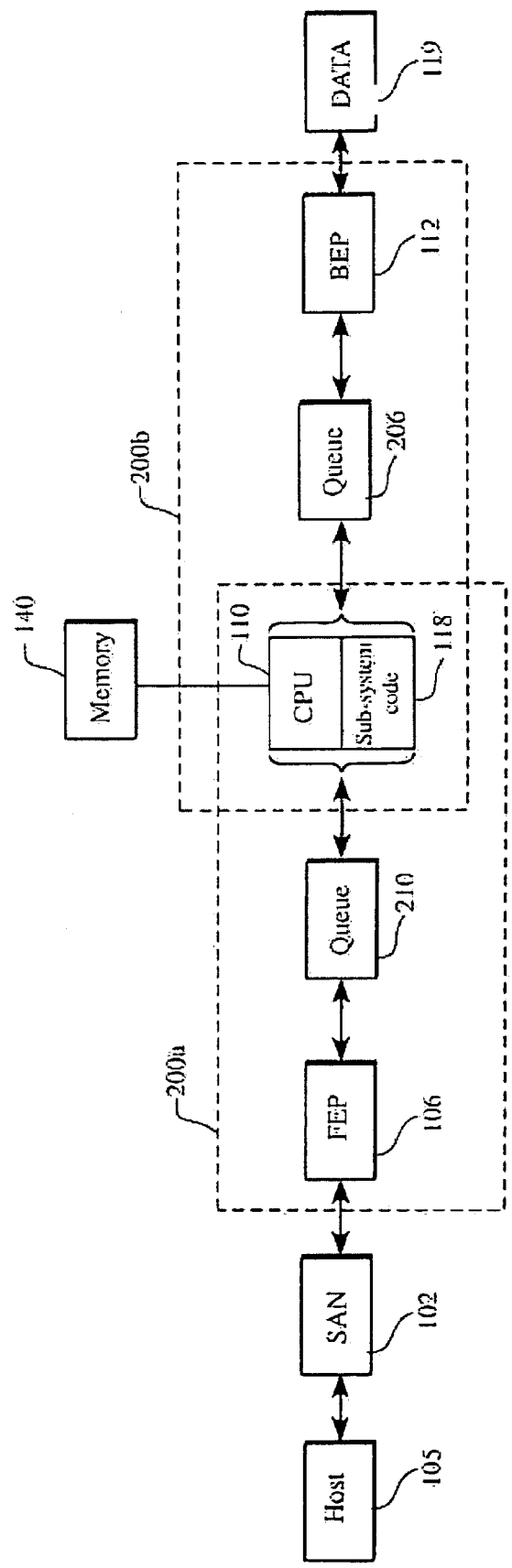
FIG. 4A is a simplified schematic diagram illustrating a data communication path including a catch-up queue in accordance with one embodiment of the present invention.

FIG. 4A is a simplified schematic diagram illustrating a data communication path including a catch-up queue in accordance with one embodiment of the present invention. Host 105 communicates with the front end port 106 through the storage area network 102. The front end port 106 communicates with the CPU 110 and the sub-system code 118 through queue 210. The transfer of data between the front end port 106 and the sub-system code 118 is executed through the CPU 110 of front end communication module 200a. The CPU 110 is also in communication with the memory 140. The CPU 110 and the sub-system code 118 communicate with the back end port 112 through queue 206. The transfer of data between the back end port 112 and the sub-system code 118/CPU 110 is illustrated by back end communication module 200b. The back end port 112 communicates with a storage device, such as disks 114 of FIG. 2, in order to access data 119. In one embodiment, queue 210, also referred to as a catch-up queue, may be a pair of circular queues resident in memory of the front end port 106 that enable the synchronization of data communication rates between the sub-system code 118 and the front end port 106. It should be appreciated that any suitable type of queues described herein may be used to synchronize data transmission between the front end port 106 and the sub-system code 118. Similar to the front end communication module 200a, the queue 206 of the back end communication module 200b may be a pair of circular queues resident in the memory of the back end port 112 that enable the synchronization of data communication rates between the sub-system code 118 and the back end port 112. Alternatively, the queues 206 and 210 may be allocated in system memory 140, thus, during chip initialization pointers to queues 206 and 210 are provided to back end port 112 and front end port 106, respectively.

Figure 4B:
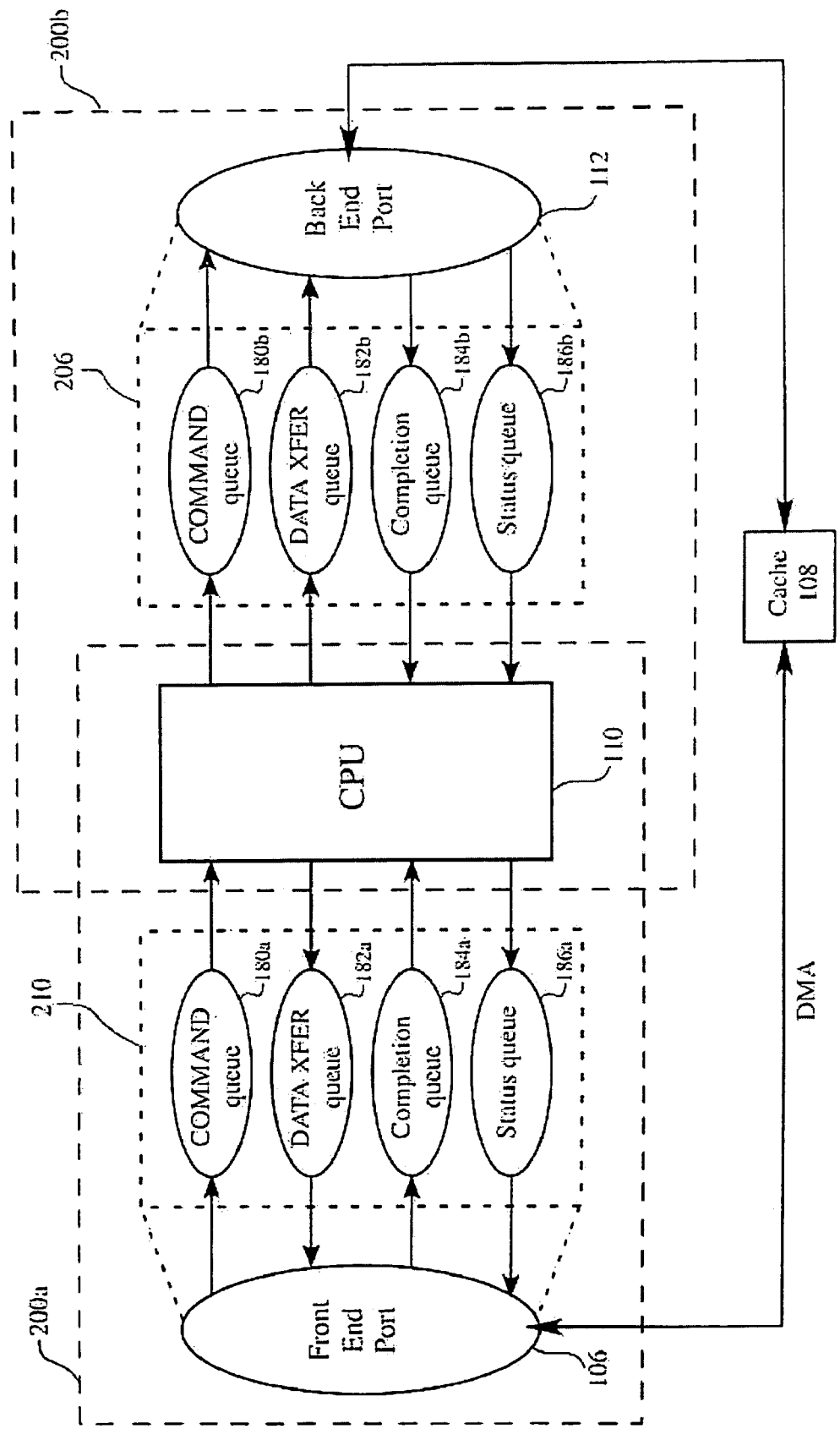
FIG. 4B is a simplified schematic diagram illustrating a high level overview of four independent queues for each of the front end communication module and back end communication module in accordance with one embodiment of the present invention.

FIG. 4B is a simplified schematic diagram illustrating a high level overview of four independent queues for each of the front end communication module and back end communication module in accordance with one embodiment of the present invention. The four independent queues for the front end communication module include a command queue 180a, a data transfer queue 182a, a completion queue 184a, and a status queue 186a. As discussed above in reference to FIG. 4A, the queues 180a, 182a, 184a, and 186a may be located within the front end port 106. It should be appreciated that the command queue 180b, the data transfer queue 182b, the completion queue 184b, and the status queue 186b are similarly located within the back end port 112. In such an embodiment, the flow of the control signals through the command queue 180b and the data transfer queue 182b of the back end communication module 200b flows from the system software running in the CPU 110 to the back end port 112. The flow of the control signals through the completion queue 184b and the status queue 186b of the back end communication module 200b flows from the back end port 112 to the system software running in the CPU 110.

It should be further appreciated that the command queue 180a and the completion queue 184a of front end port 106 may be combined into a single queue due to the similar control signal flow direction through the command queue 180a and the completion queue 184a. Likewise, the data transfer queue 182a and the status queue 186a may also be combined into a single queue due to the similar control signal flow direction through the data transfer queue 182a and the status queue 186a. The command queue 180b and the data transfer queue 182b of the back end port 112 may be combined into a single queue, as well as the completion queue 184b and the status queue 186b. As illustrated, the actual data is transferred by the back end port 112 to cache 108. This data may then be accessed by front end port 106 through a direct memory access (DMA).

Figure 4C:
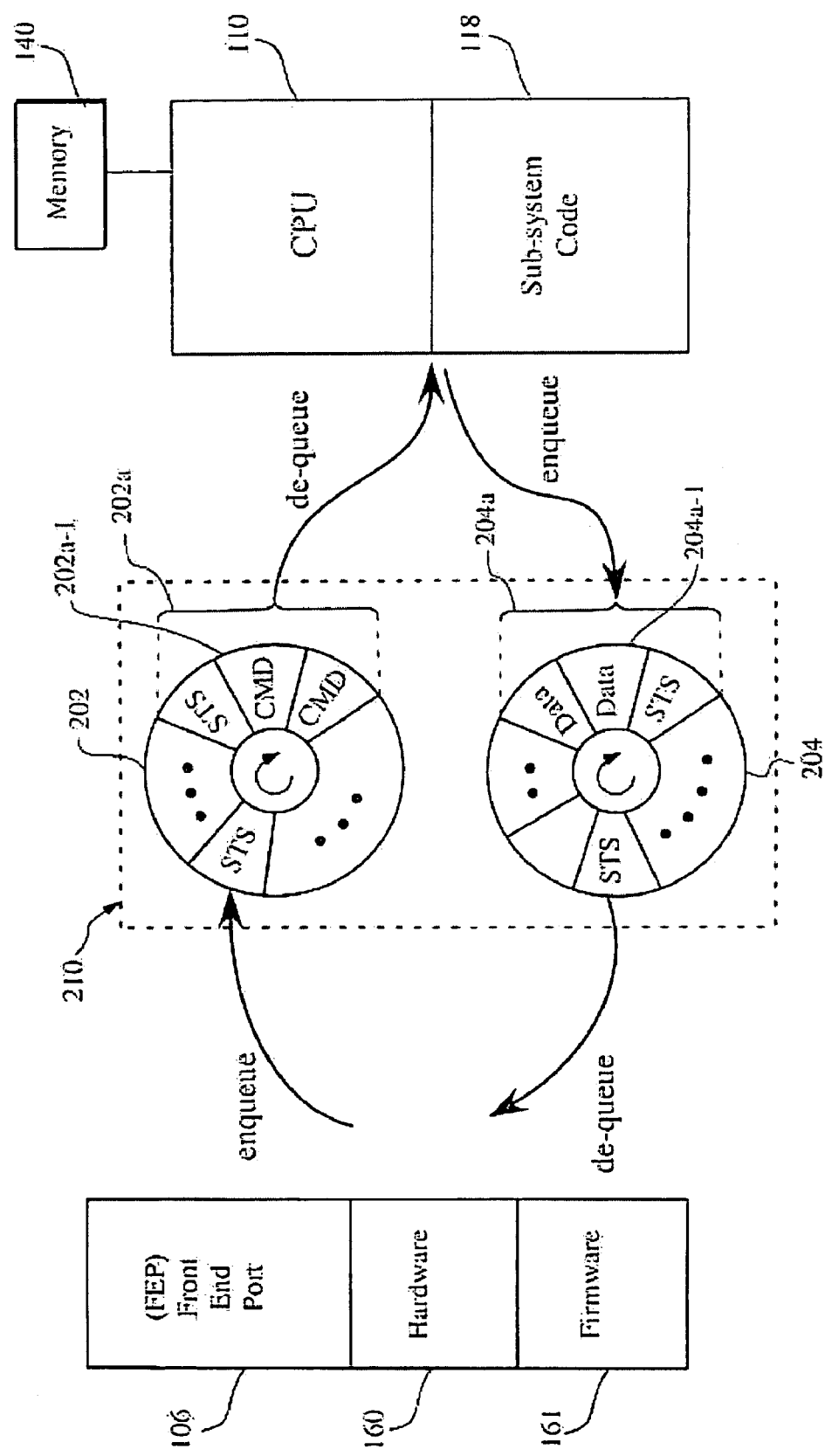
FIG. 4C illustrates a catch-up queue system in accordance with one embodiment of the present invention.

FIG. 4C illustrates a catch-up queue system in accordance with one embodiment of the present invention. Here, the catch-up queue 210 includes a request queue 202 and a response queue 204. As used herein, request queue 202 may be referred to as a write queue or an input queue, while response queue 204 may be referred to as a read queue or output queue. In one embodiment, the request queue 202 is a single queue that includes the command queue 180a and the completion queue 184a, as discussed above with reference to FIG. 4B. Similarly, the response queue 204 is a single queue that includes the data transfer queue 182a and the status queue 186a as discussed with reference to FIG. 4B. The front end port 106 includes hardware 160 and firmware 161.

Each of the request queue 202 and the response queue 204 may contain a certain number of slots (e.g., memory spaces or buffer elements) that can contain a command or a status indicator. It should be appreciated that each queue may be any suitable size and have any suitable number of slots as long as the methodology consistent with what is described herein is applied. In one embodiment, the request queue 202 and the response queue 204 may include between 64 and 1024 slots. The command may be any suitable command for conducting a de-queue operation (reading from the queue) or an en-queue operation (writing to the queue) and the status indicator may communicate the status of the respective de-queue operation or en-queue operation. In utilizing the adaptive synchronization discussed herein, the front end port 106 can input a series of commands and/or status notifications to the request queue 202. In such an embodiment, all of the commands and/or status notifications in the request queue 202 may be posted by the front end port 106 before the CPU 110 is interrupted. In this way, the number of times the CPU 110 is interrupted may be minimized.

It should be appreciated that every time the CPU 110 is interrupted, a delay is caused in the processing and the transfer of other data being handled by the CPU. Too many CPU interrupts are not desirable since the interrupts preempt or stall the data processing operations by the CPU and after the interrupts are processed by the CPU the data processing operations are then resumed. Consequently, by minimizing CPU interrupts by the adaptive synchronization techniques described herein, data transfer rates may be optimized. However, when the CPU interrupts are minimized too much, then the CPU 110 may not be processing data at an optimum rate because the CPU 110 might be waiting to receive data from the request queue 202. Such a situation may occur when the CPU 110 is not interrupted until the request queue 202 is totally filled up. Here, the CPU 110 may be wasting valuable CPU power by not having data to process while the request queue 202 is being filled up.

As a result, in one embodiment of the present invention, adaptive synchronization controls and adjusts the number of commands/status notifications posted in the request queue 202 before the CPU 110 is interrupted. This may be done by the monitoring of CPU activity and by the use of a feed back mechanism to enable CPU interrupts after a certain number of posts (commands/status notifications) have been made to the request queue 202. After a certain number of commands and/or status notifications are posted in the request queue 202, the CPU 110 is interrupted to process all of the commands and/or status notifications. Therefore, CPU interrupts are reduced while CPU processing usage is maximized.

Figure 5:
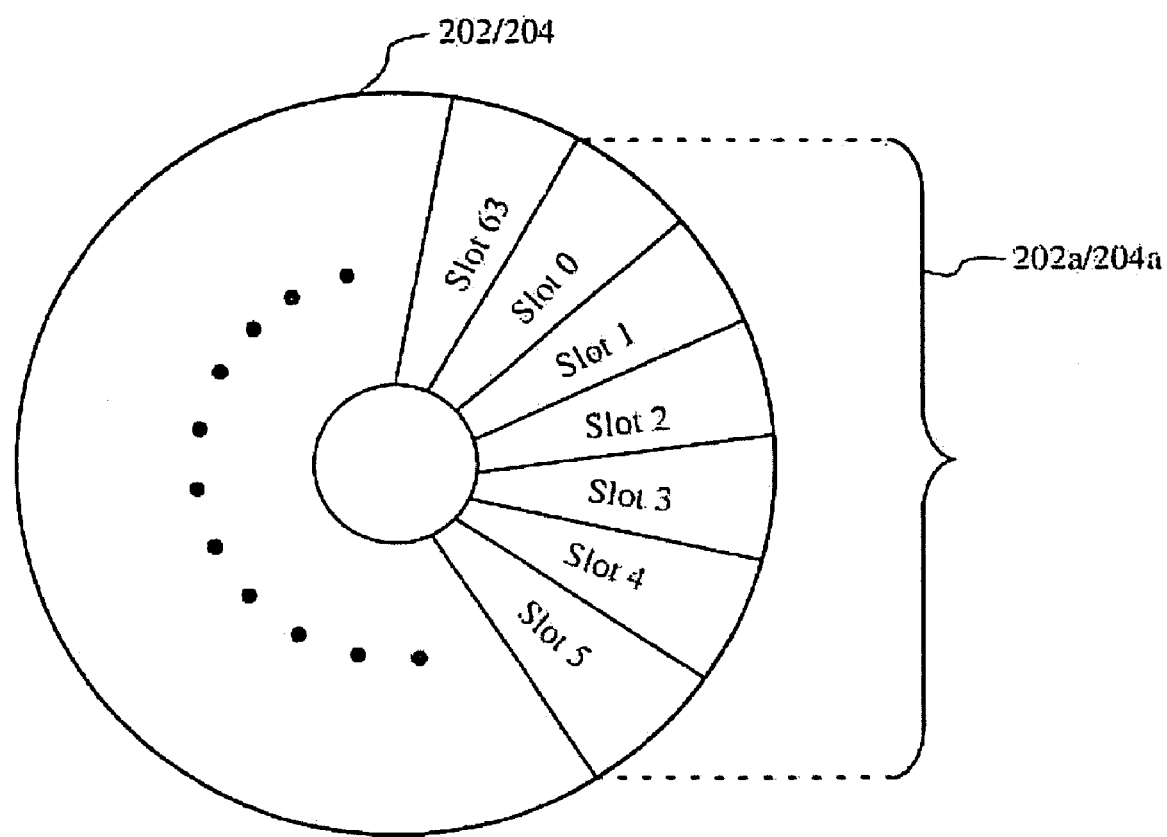
FIG. 5 is a simplified schematic diagram illustrating an exemplary queue in accordance with one embodiment of the present invention.
Figure 6:
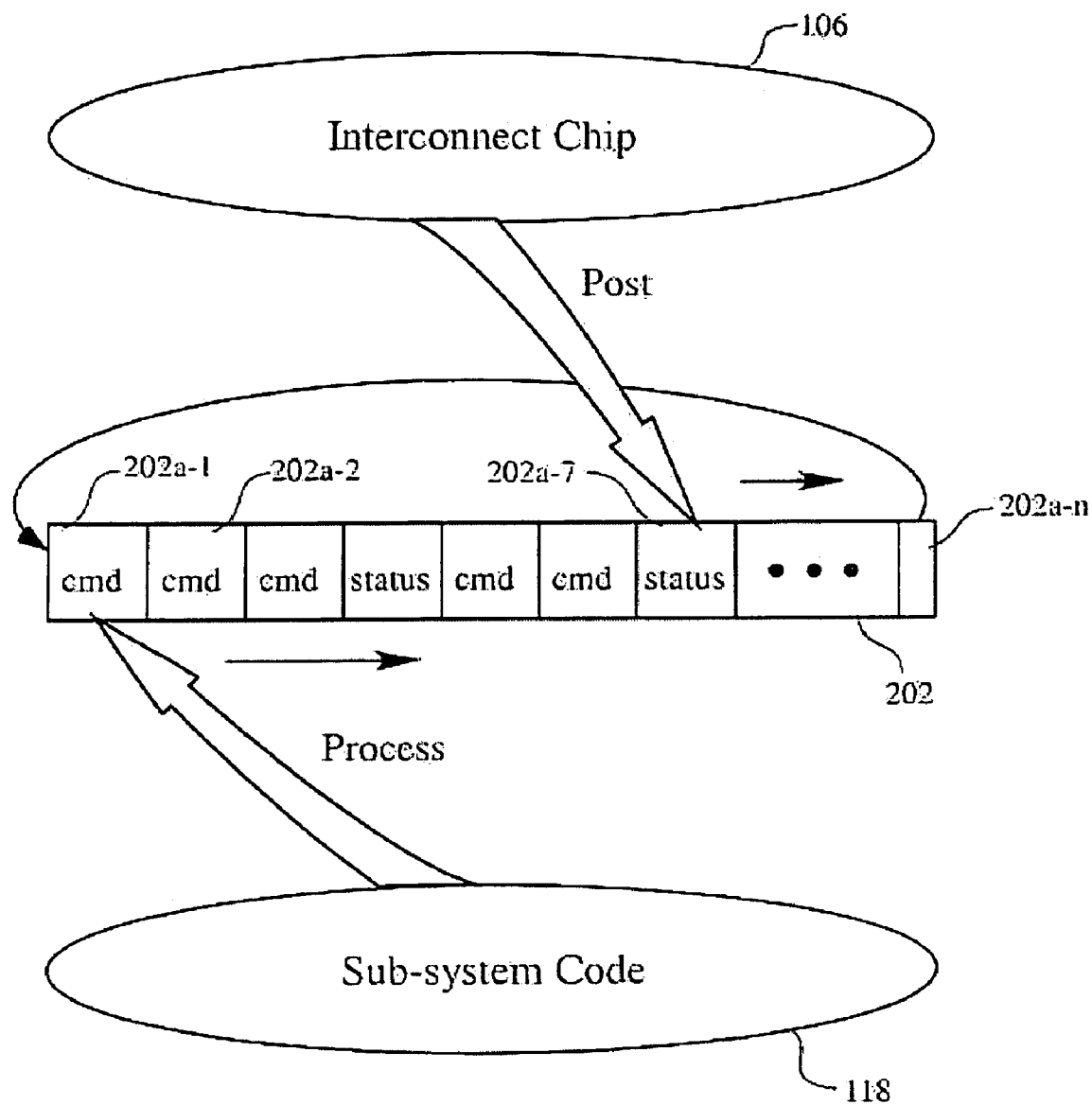
FIG. 6 is a simplified schematic diagram illustrating the operation of a circular queue in accordance with one embodiment of the invention.

In one embodiment, as shown in FIG. 4C, a write command 202a-1 may be posted to the request queue 202. In this embodiment, the request queue 202 is a circular queue. A circular queue, also known as a circular buffer, may be an area of memory used to store a continuous stream of data by starting again at the beginning of the buffer after reaching the end. A circular queue is typically written by one process and read by another. Separate read and write pointers are maintained and these pointers are not allowed to pass each other otherwise either unread data would be overwritten or invalid data would be read. An exemplary circular queue configuration is illustrated in FIGS. 5 and 6. In another embodiment, the sub-system code 118 being run by the CPU 110 reads the posts from buffer elements 202a in the request queue 202 as the front end port fills buffer elements that have been previously read or are empty. Here, the CPU 110 collects posts associated with buffer elements 202a according to a catch-up threshold (also referred to as a catch-up value, queue number, catch-up queue value, or queue value), which is the number of posts made before the CPU 110 is interrupted. The catch-up threshold may be stored in the memory 140 and may be adjusted depending on CPU usage conditions as compared to the conditions of the interconnect chip, such as the front end port 106. One skilled in the art will appreciate that the catch-up threshold may be stored in any suitable memory region, e.g., the resident memory of the front end port and the back end port. The catch-up threshold is adaptive. For example, depending on the amount of imbalance between the request queue 202 and the response queue 204, the catch-up threshold may be adjusted to equalize the data being transferred in the request queue 202 and the response queue 204.

Once the CPU 110 receives and processes the command 202a-1 requesting data, the CPU 110 posts data location information in the response queue 204. The data location information may be pointers indicating where the data is located so direct memory access (DMA) data transfers may be utilized to move data between the cache of the CPU 110 and the front end port 106.

In such an embodiment, the CPU 110 may send a data request to the back end port through a command queue. The command queue utilized for such a data communication may be equivalent or similar to the command queue utilized by the front end port to request data from the CPU 110. After retrieving and processing the data request, the back end port may retrieve data from a storage device and send the retrieved data to the cache. The back end port is notified of the data pointers in the cache 108 (of FIG. 2) to place the data from the storage device as part of the command specified in the command queue. At this point, the CPU 110 may send the data pointers indicating the location of the retrieved data to the response queue 204 of the front end port. After the front end port receives the data pointers, the front end port can retrieve the data directly from the cache 108 since the address for retrieving the data is provided by the pointers.

Figure 4D:
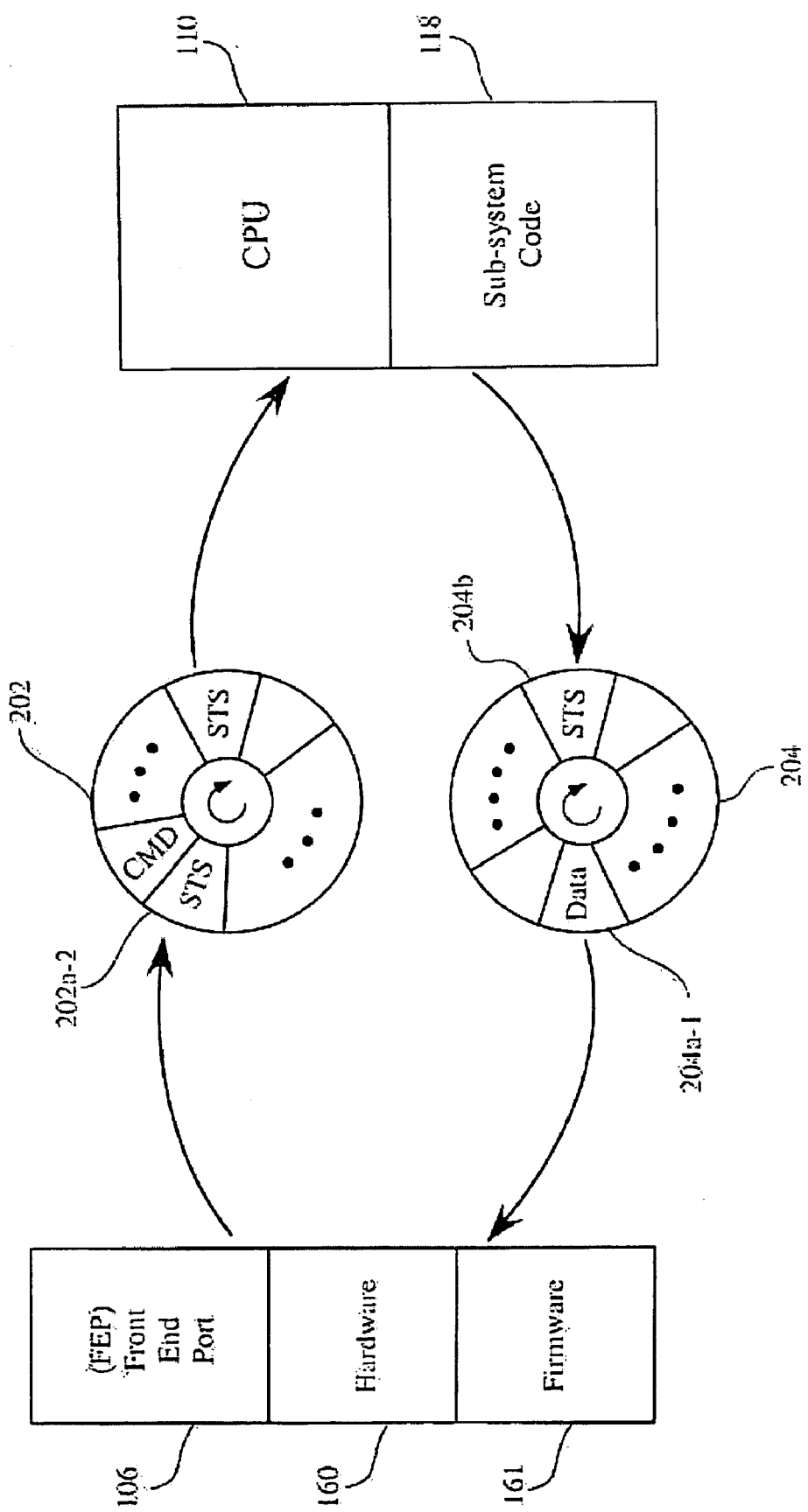
FIG. 4D is a schematic diagram illustrating the data transfer procession in accordance with one embodiment of the present invention.

FIG. 4D is a schematic diagram illustrating the data transfer procession in accordance with one embodiment of the present invention. The front end port 106 collects and processes posts/requests from the response queue 204 in a similar manner to how the CPU 110 collects posts from the request queue 202. The response queue 204, in one embodiment, is a circular queue. Thus, as the front end port 106 gathers posts from certain locations within the circular queue, open slots of the response queue 204 receive more posts from the CPU 110. Therefore, the slot containing the data location information 204a-1 that was posted by the CPU 110 in FIG. 4C is now read by the front end port 106. Once the front end port 106 has gathered and processed the data location information 204a-1, the front end port posts status 202a-2 in an open slot (buffer element) of the request queue 202.

Figure 4E:
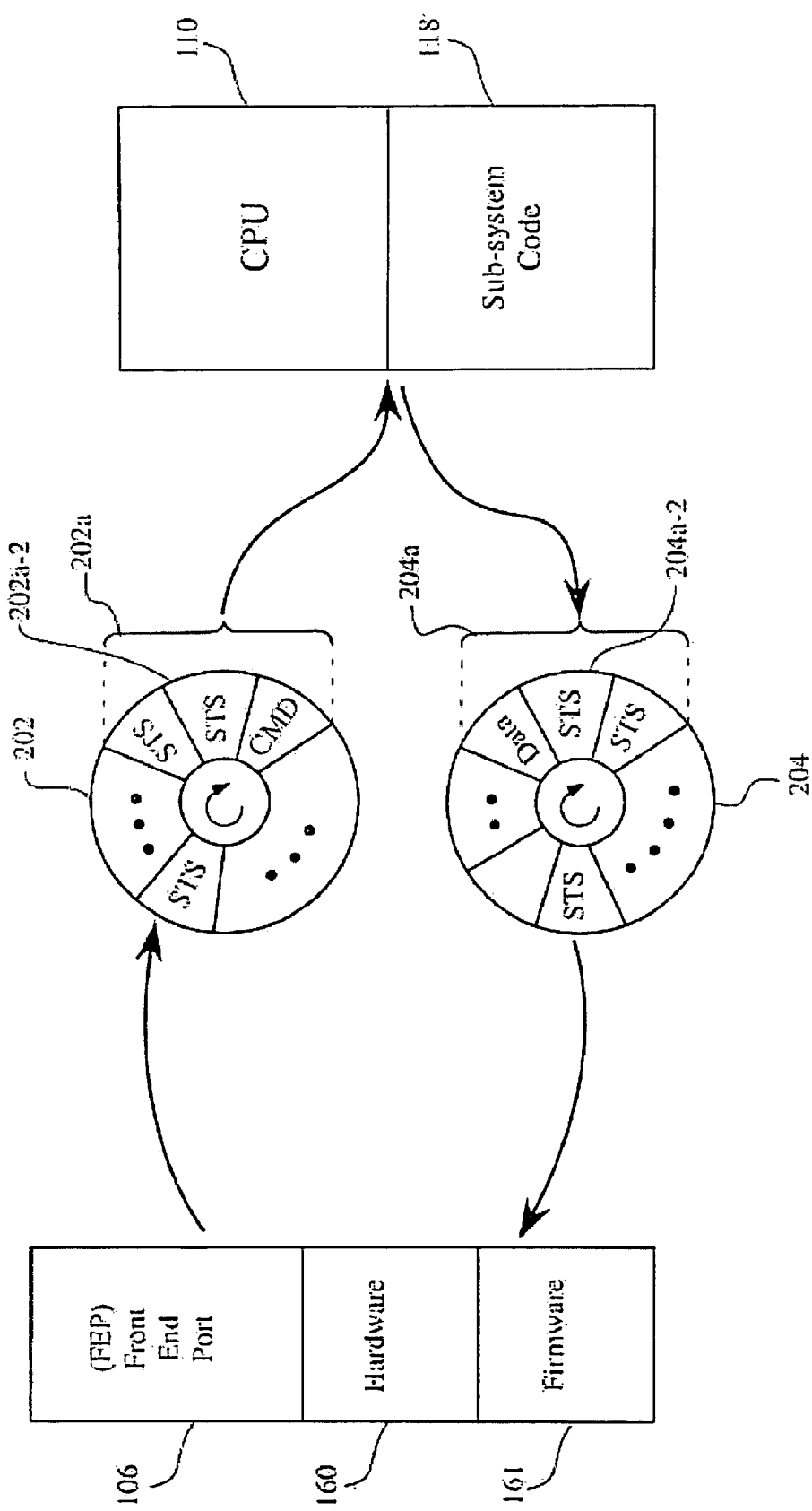
FIG. 4E shows a further progression of a data transfer operation in accordance with one embodiment of the present invention.

FIG. 4E shows a further progression of a data transfer operation in accordance with one embodiment of the present invention. Here, the slot of the request queue 202 containing status 202a-2 has been "rotated" to a position where the CPU 110 may collect the information. At this point in time, a status 204a-2 corresponding to the status 202a-2 is posted in the response queue by the CPU 110 to notify the front end port 106, that the CPU 110 received the status 202a-2. It should be appreciated that the term "rotate" is used to figuratively describe the movement of data, that is, the actual queue does not rotate, but the data pointers are configured to direct the CPU 110 or front end port 106 to the corresponding buffer slot or slots to be read from or written to, as discussed in more detail with reference to FIG. 6.

FIG. 5 is a simplified schematic diagram illustrating an exemplary queue in accordance with one embodiment of the present invention. The queue 202/204 may be utilized as either the request queue 202 and the response queue 204. In one embodiment, the queue 202/204 is a circular queue with 64 slots for storing commands/status notifications. It should be appreciated that the queue 202/204 may be any suitable type of queue with any suitable number of slots such as, for example, 64, 128, 256, 512, 1024, etc. In another embodiment, depending on the catch-up threshold, data within a group 202a/204a of slots in the queue 202/204 is collected by the CPU 110 per a single interrupt.

The catch-up threshold may be adjusted according to the CPU processing rate of the posts that are gathered from the request queue. In one embodiment, if the CPU processing rate of the posts is slow and the request queue is full, while the response queue is not full, the catch-up threshold may be decreased so that less data is gathered by the CPU from the request queue for every interrupt. In this way, the CPU collects less data to process which results in a lower number of slots being opened up on the request queue. This may result in the equalization (or reduction in the imbalance) of the data transfer rate of the request queue and the data transfer rate in the response queue. In this way, both the CPU and the front end port (or also the back end port in a CPU-back end port data transfer) can be synchronized to optimize data transfer. Conversely, when the CPU processing rate is relatively high and the software monitoring the data transfer process determines that the CPU has capability to process more data, the catch-up threshold is increased so more data is gathered by the CPU per interrupt. When this occurs, more slots in the request queue may be made available, thereby allowing the front end port to post more I/O transactions. In this way, the data transfer may be maximized by increasing the data transfer rate in the request queue which results in a decreased imbalance with the data transfer rate of the response queue.

FIG. 6 is a simplified schematic diagram illustrating the operation of a circular queue in accordance with one embodiment of the invention. Here, request queue 202 includes a number of buffer elements 202a-1 through 202a-n. Sub-system code 118 reads data from a particular number of buffer elements 202a-1 through 202a-n according to read data pointers which may be stored in a cache memory. Interconnect chip 106 posts I/O transactions to request queue 202 according to write data pointers. In operation, the I/O transactions posted to the request queue 202 by interconnect chip 106 are eventually read by sub-system code 118. As mentioned above, the read data pointers are prevented from passing each other. After interconnect chip 106 writes to the last buffer slot 202a-n, data from the interconnect chip is then directed to the first slot 202a-1 in order to write data therein once the sub-system code 118 has read the data. In a similar fashion, when sub-system code 118 reads the last buffer slot 202a-n, the software will then be directed back to the first buffer slot 202a-1 and the process repeats. In one embodiment, the read and write data pointers are incremented by an amount dictated by the catch-up threshold for each cycle. For example, if the catch-up threshold is equal to 10, then the interconnect chip 106 posts a first set of 10 I/O transactions beginning at a first address, as provided by the write data pointer, of the request queue 202. Thereafter, the write data pointer is incremented so that the next set of 10 commands may be written into the request queue 202 following the first set. One skilled in the art will appreciate that the difference between a write data pointer and a read data pointer associated with queue 202 may be used to determine the fullness of queue 202. For example, a write data pointer may direct interconnect chip 106 to write to buffer slot 202a-7, while a read pointer may direct software 118 to read from buffer slot 202a-1. If the difference between a value associated with buffer slot 202a-7 and a value associated with buffer slot 202a-1 is equal to the size of queue 202, then the queue 202 is full. If the difference is less than the size of queue 202, then there is at least one free buffer slot.

Figure 7:
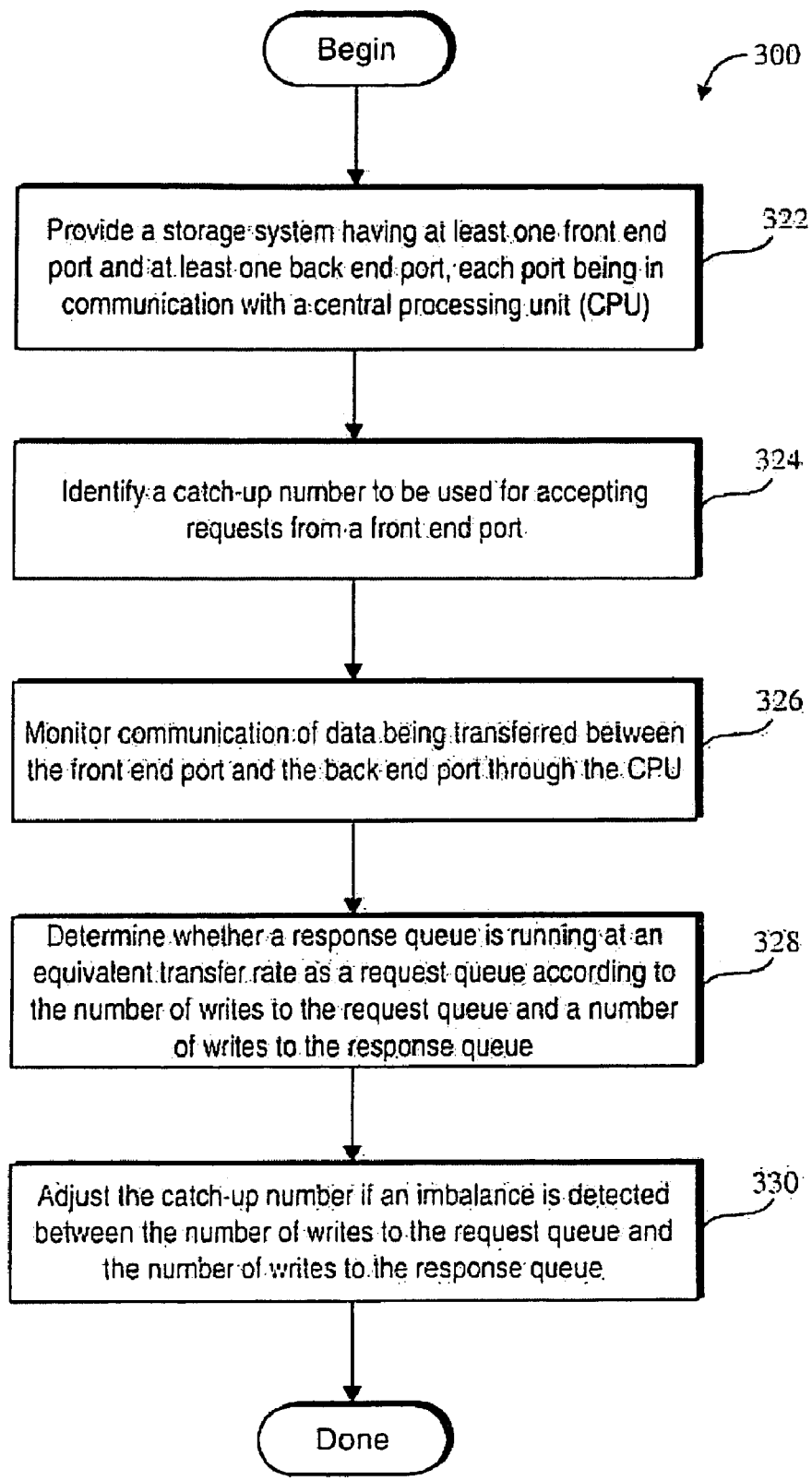
FIG. 7 is a flowchart diagram illustrating the method operations for the transfer of data in a storage system in accordance with one embodiment of the present invention.

FIG. 7 is a flowchart diagram illustrating the method operations for the transfer of data in a storage system in accordance with one embodiment of the present invention. It should be understood that the processes depicted in the FIG. 7 may be provided in a program instruction form written on any suitable type of computer readable media. For instance, the program instructions can be in the form of software code developed using any suitable type of programming language. Flowchart 300 initiates with operation 322 which provides a storage system having at least one front end port and at least one back end port and a CPU for communicating with the front end port and the back end port. An exemplary storage system is depicted in FIGS. 2 and 3. The method then advances to operation 324 where a catch-up threshold is identified to be used for accepting requests from the front end port. The catch-up threshold is a value representing a number of commands and/or status notifications processed through the software at a time. It should be appreciated that the catch-up threshold may be represented as an actual number of I/O transactions. In one embodiment, the catch-up threshold may be input by a user through a user interface. In another embodiment, the catch-up threshold defaults to an initial value stored in either the cache memory or main memory.

Continuing with FIG. 7, the method proceeds with operation 326 which monitors communication of data being transferred between a front end port and a back end port through a CPU that uses software to facilitate the communication. For example, the monitoring of the system may include collecting events, as described above, and generating statistics from the collected events. Then the method moves to operation 328 which determines whether the response queue is running at an equivalent transfer rate as the request queue based on a number of writes to the request queue from the front end port and a number of writes to the response queue from the CPU. The method moves to operation 330 which adjusts the catch-up threshold if an imbalance is detected between the number of writes to the request queue and the number of writes to the response queue. It should be appreciated that the statistics, e.g., the balance between requests made to corresponding queues, and tracking the amount of time taken by the interrupt thread in the operating system, generated from the collected events may be considered when adjusting the catch-up threshold.

Figure 8:
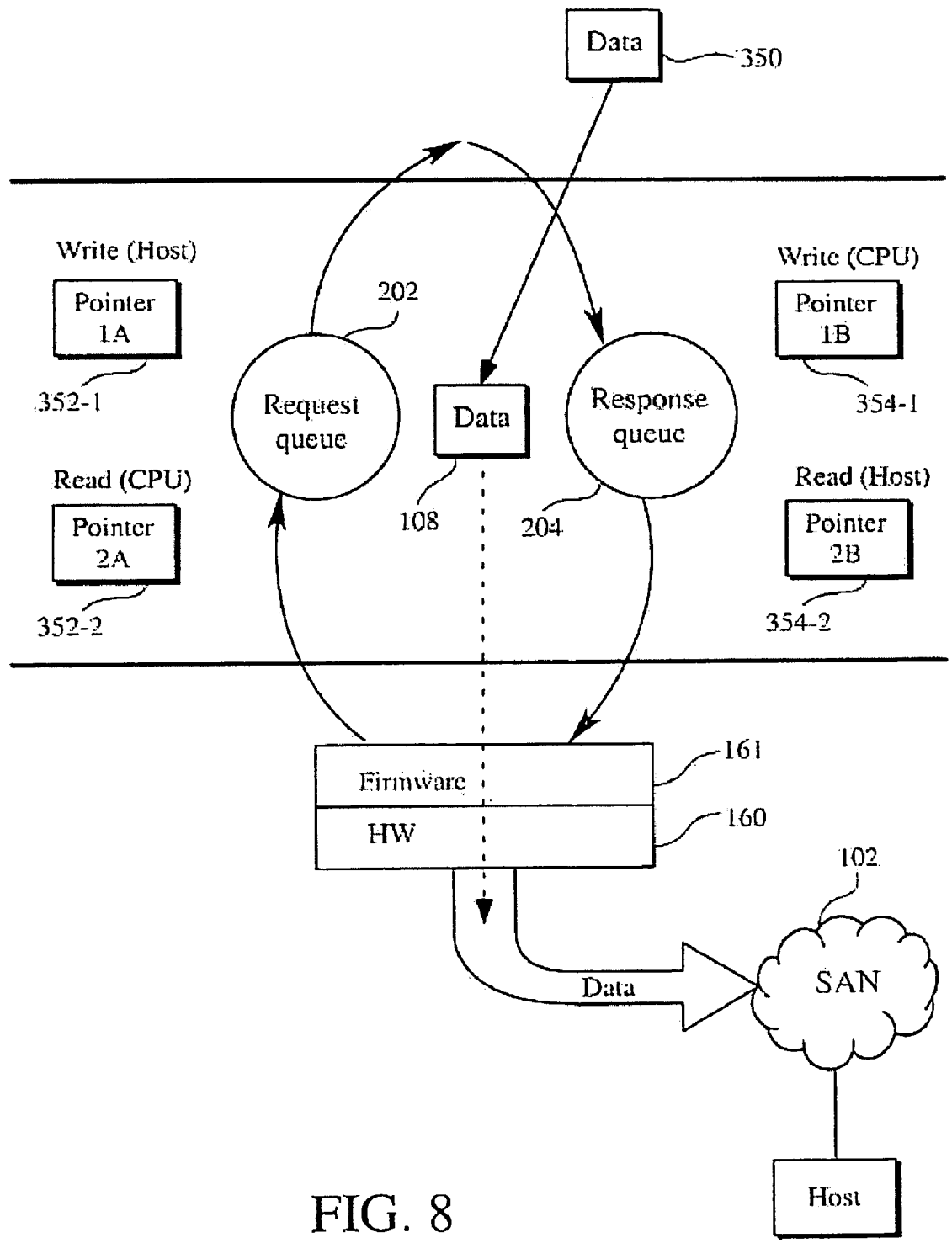
FIG. 8 is a simplified schematic diagram illustrating the use of an input queue and an output queue in order to improve communication channel utilization to increase throughput in accordance with one embodiment of the invention.

FIG. 8 is a simplified schematic diagram illustrating the use of a request queue and an response queue in order to improve communication channel utilization to increase throughput in accordance with one embodiment of the invention. Here, request queue 202 is associated with write pointer 1A 352-1 and read pointer 2A 352-2. Likewise, response queue 204 is associated with write pointer 1B 354-1 and read pointer 354-2. Here, the writer (the entity writing the data) will update the corresponding write data pointer, while the reader (the entity reading the data) updates the corresponding read data pointer. Furthermore, it will be apparent that the driver managing each of the queues discussed herein is executed by the CPU running the sub-system code. Request queue 202 and response queue 204 provide a communication channel between the storage system and hardware 160/microcode 161. Data 350, which is stored in memory, may then be accessed through the communication channel, temporarily stored in cache 108, and transmitted to an external device through storage area network 102. Further details of the communication channel configuration of FIG. 8 will be explained below with reference to FIG. 9.

Figure 9:
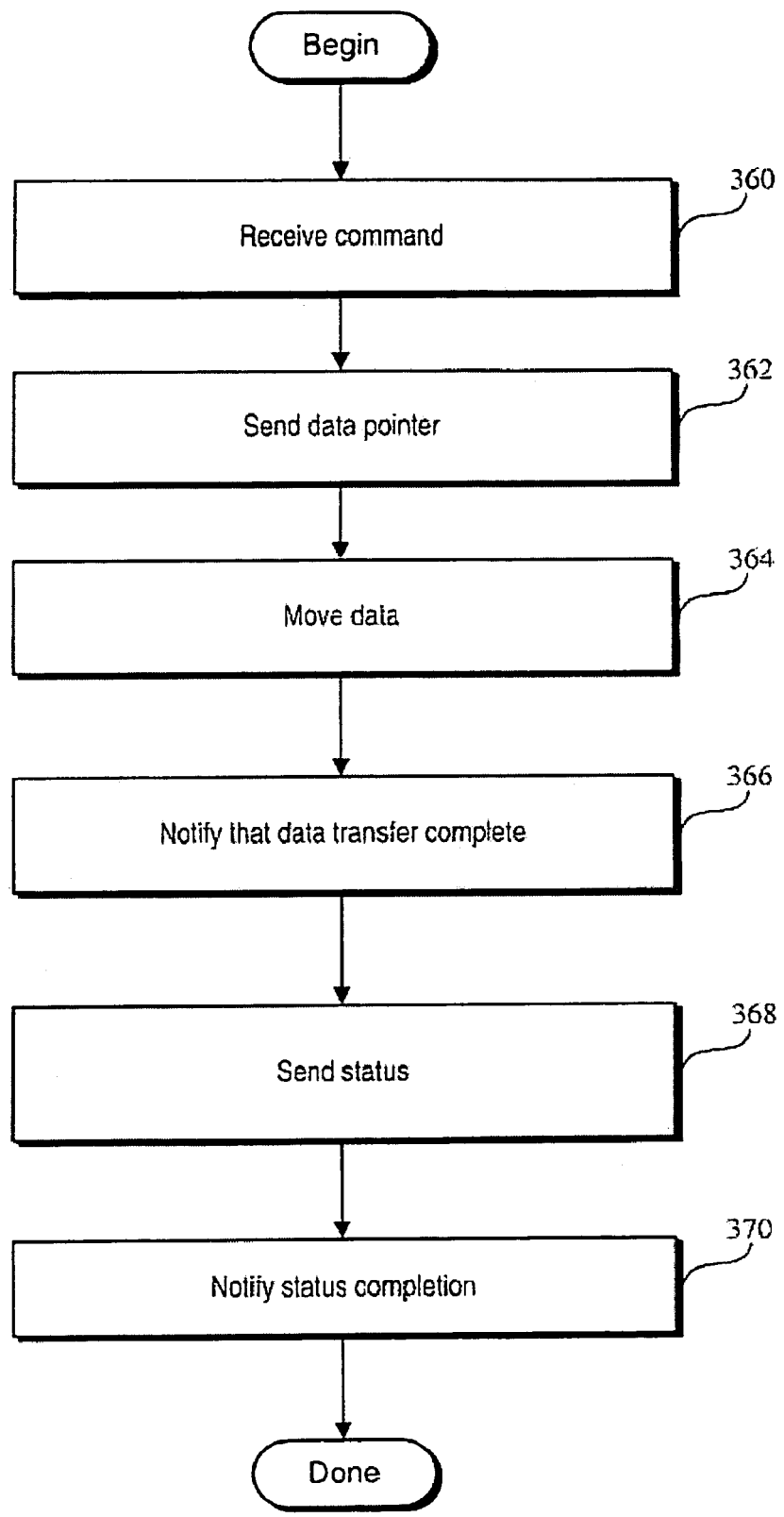
FIG. 9 is a flow chart diagram illustrating the method operations for using a communication channel in order to improve throughput in accordance with one embodiment of the invention.

FIG. 9 is a flow chart diagram illustrating the method operations for using a communication channel in order to improve throughput in accordance with one embodiment of the invention. FIGS. 8 and 9 will be referred to here in order to provide a detailed explanation on the efficient use of the communication channel. FIG. 9 initiates with method operation 360 where a command, i.e., an I/O transaction, is received. For example, the command may be received from a network, such as SAN 102 of FIG. 8. Here, the command proceeds through request queue 202 of FIG. 8. The sub-system code then sends a data pointer through response queue 204 in operation 362. It will be apparent to one skilled in the art that pointers 352-1, 352-2, 354-1, and 354-2 are each capable of issuing a data pointer depending on the direction of the communication. The method advances to operation 364 where hardware 160, and microcode 161, move the data through the hardware/network. Hardware 160, in conjunction with microcode 161, then issues a data notification transfer completion through request queue 202 in operation 366. Then, in operation 368, the sub-system code sends a status request through response queue 204 in response to the receipt of the transfer completion. Hardware 160 then notifies the sub-system code of the status completion through request queue 202 in operation 370.

As described above, in one embodiment, the catch-up threshold may be adjusted to reduce the imbalance by monitoring the CPU data processing rate and the amount of data waiting to be processed by the CPU. Therefore, depending on the CPU status, the catch-up threshold may be changed to optimize data transfer depending on the system conditions. In one embodiment, if the CPU processing rate of the posts is slow and/or the data waiting to be processed becomes larger than desired, the catch-up threshold may be decreased so less data is gathered by the CPU from the request queue for every interrupt. In this way, the CPU gathers less data to process, which results in a lesser number of slots being opened up on the request queue, which in turn may result in the equalization (or reduction) in the imbalance of the data transfer rate of the request queue and the data transfer rate in the response queue. The equalization may occur because the front end port cannot post more I/O transactions in the request queue when there are no open slots available. Thus, both the CPU and the front end port (or alternatively the back end port in a CPU-back end port data transfer) can be synchronized to optimize data transfer. It should be appreciated that the catch-up threshold as used herein is a ceiling/throttle value which is a dynamic parameter based on depth of a current queue and amount of time taken by the interrupt thread in the operating system. The depth of the queue may be monitored through well known techniques, e.g., the difference between the read data pointer and the write data pointer, as mentioned above. It should be appreciated that the amount of time taken by the interrupt thread may be determined by sampling and averaging time stamp data associated with a high resolution timer of the CPU. It should be appreciated that the number of I/Os processed per second is significantly enhanced through the throttling effect of the catch-up threshold, and drives the hardware to its limit for the efficient movement of data.

Conversely, when the CPU processing rate is high and the software monitoring the data transfer process determines that the CPU has capability to process more data, the catch-up threshold is increased so more data is gathered by the CPU per interrupt. When this occurs, more slots in the request queue may be made available thereby allowing the front end port to post more commands and status notifications. Therefore, the generally greater CPU power, as compared to the hardware of the front end port, may be utilized to increase data throughput. By gathering data from the slots of the request queue and giving control back to the front end port, the front end port may use its limited processing power more effectively and can keep issuing commands and statuses into the request queue. In the meantime, the CPU can process the gathered I/O transactions and input the responses into the response queue while the front end port is working at the same time to input more data into the request queue. In this way, the data transfer may be maximized by increasing the data transfer rate in the request queue which results in a decreased imbalance with the data transfer rate of the response queue. Because the front end ports typically have less processing power than the CPU, by increasing the efficiency of the front end port by giving control to the front end port as long as possible, the data transfer may be optimized in accordance with the processing power of the front end port. Consequently, by using adaptive synchronization where the catch-up threshold is adjusted, data transmission from either a front end port or a back end port to a CPU is optimized.

In summary, the embodiments described herein enable an efficient communication channel. The use of a catch-up threshold, in conjunction with the request and response queues, allows for the optimization of the communication flow. As mentioned above, the catch-up threshold determines an optimum amount of data to fetch from the request queue. In addition, the request queue takes into consideration the amount of time taken by the interrupt thread in the operating system and the system activity in the operating system. Thus, the other processes being performed by the CPU are considered. The catch-up threshold is also adaptive. That is, through feedback that monitors the amount of data within the queue, or the amount of other processes being performed by the CPU, the catch-up threshold may be increased or decreased in order to adjust to any imbalance. For example, where a burst of requests come into the queue, the catch-up threshold may be increased in order to accommodate the increased amount of requests. Of course, the catch-up threshold may be decreased where the amount of requests in the queue are dropping over time. In addition, while a request queue and a response queue are provided as examples, it should be appreciated that any number of queues may be included, i.e., more than two queues. Furthermore, the embodiments described herein may be applied to any suitable system where data is moved through a port as directed by a processor and is not limited to a storage system environment. In addition, the queues referred to above are not required to be circular, e.g., a FIFO buffer may be used.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for transferring data in a storage system, comprising:
    setting a first catch-up threshold for accepting data requests from a first port, the first catch-up threshold corresponding to a number of requests collected from a first queue for each CPU interrupt, the first queue being configured to receive requests to the first port and store the requests to be collected by a central processing unit (CPU); and
    adjusting the first catch-up threshold to reduce an imbalance between the number of requests made to the first queue and a number of requests made to a second queue during a time period, the second queue being configured to receive and store requests from the CPU to the first port.

2. A method for transferring data in a storage system as recited in claim 1, further comprising:
    setting a second catch-up threshold for accepting data requests from a second port, the second catch-up threshold corresponding to a number of requests collected from a third queue for each CPU interrupt, the third queue being configured to receive requests to the second port and store the requests to the second port to be collected by the CPU; and
    adjusting the second catch-up threshold to reduce an imbalance between the number of requests made to the third queue and a number of requests made to a fourth queue during the time period, the fourth queue being configured to receive and store requests from the CPU to the second port.

3. A method for transferring data in a storage system as recited claim 1, wherein the first queue and the second queue are circular queues.

4. A method for transferring data in a storage system as recited claim 1, wherein the first queue is at least one of a command queue and a completion queue and the second queue is at least one of a data transfer queue and a status queue.

5. A method for transferring data in a storage system as recited in claim 1, wherein adjusting the first queue value includes,
    detecting if the number of requests to the first queue is less than the number of requests to the second queue in the time period; and
    increasing the first catch-up threshold in response to detecting that the number of requests to the first queue is less than the number of requests to the second queue in the time period.

6. A method for transferring data in a storage system as recited in claim 1, wherein adjusting the first queue value includes,
    detecting if the number of requests to the first queue is greater than the number of requests to the second queue in the time period; and
    decreasing the first catch-up threshold in response to detecting that the number of requests to the first queue is greater than the number of requests to the second queue in the time period.

7. A method for transferring data in a storage system with a central processing unit (CPU) for communicating with at least one port, comprising:
    monitoring data being transferred between a front end port and a back end port through the CPU;
    determining whether a data transfer queue is running at an equivalent transfer rate as a command queue; and
    adjusting a catch-up threshold to reduce an imbalance between a number of writes to the command queue and a number of writes to the data transfer queue.

8. A method for transferring data in a storage system with a CPU as recited in claim 7, wherein adjusting the catch-up threshold includes increasing the catch-up threshold when the data transfer queue is running at a lower transfer rate than the command queue and decreasing the catch-up threshold when the data transfer queue is running at a higher transfer rate than the command queue.

9. A method for transferring data in a storage system with a CPU as recited in claim 7, wherein the command queue and the data transfer queue are circular queues.

10. A method for transferring data in a storage system with a CPU as recited in claim 7, wherein the determining whether a data transfer queue is running at an equivalent transfer rate as a command queue includes,
    tracking a number of writes to each of the data transfer queue and the command queue during a time period.

11. A method for transferring data in a storage system with a CPU as recited in claim 10, further comprising:
    determining if the number of writes to the data transfer queue is greater than the number of writes to the command queue during the time period.

12. A method for transferring data in a storage system with a CPU as recited in claim 7, further comprising:
    collecting event data associated with the data being transferred between the front end port and the back end port through the CPU.

13. A method for transferring data in a storage system with a CPU as recited in claim 12, wherein the adjusting a catch-up threshold includes,
    analyzing the event data, the analysis of the event data being considered when adjusting the catch-up threshold.

14. A computer readable storage medium with program instructions for transferring data in a storage system, the computer readable medium comprising:
program instructions for setting a first catch-up threshold for accepting data requests from a first port, the first catch-up threshold corresponding to a number of requests collected from a first queue for each CPU interrupt, the first queue being configured to receive requests from the first port and store the requests to be collected by a central processing unit (CPU); and
program instructions for adjusting the first catch-up threshold to reduce an imbalance between the number of requests made to the first queue and a number of requests made to a second queue in a time period, the second queue being configured to receive requests from the CPU and to store the requests to be collected by the first port.

15. A computer readable storage medium with program instructions for transferring data in a storage system as recited in claim 14, further comprising:
program instructions for setting a second catch-up threshold for accepting data requests from a second port, the second catch-up threshold corresponding to a number of requests gathered from a third queue for each CPU interrupt, the third queue being configured to receive requests from the second port and store the requests from the second port to be collected by the CPU; and
program instructions for adjusting the second catch-up threshold to reduce an imbalance between the number of requests made to the third queue and a number of requests made to a fourth queue in the time period, the fourth queue being configured to receive requests from the CPU and to store the requests from the CPU to be collected by the second port.

16. A computer readable storage medium with program instructions for transferring data in a storage system as recited in claim 14, further comprising:
program instructions for detecting if the number of requests to the first queue is less than the number of requests to the second queue in the time period; and
program instructions for increasing the first catch-up threshold in response to detecting that the number of requests to the first queue is less than the number of requests to the second queue in the time period.

17. A storage sub-system providing access to stored data, comprising:
a first port providing access to a host requesting data, the first port having a first port catch-up queue, the first port catch-up queue configured to store Input/Output (I/O) transactions associated with read and write requests from the host, an amount of I/O transactions posted to the first port catch-up queue at a time being controlled by a first port catch-up threshold;
a second port providing access to the stored data;
a central processing unit (CPU) in communication with the first port and the second port, the central processing unit configured to process the amount of I/O transactions per a single interrupt, the central processing unit further configured to execute code to determine whether a data transfer queue is running at an equivalent transfer rate as a command queue and to adjust a catch-up threshold to reduce an imbalance between a number of writes to the command queue and a number of writes to the data transfer queue; and
a cache memory configured to store the stored data accessed through the second port.

18. The storage sub-system of claim 17, wherein the second port includes a second port catch-up queue, the second port catch-up queue configured to store control data associated with retrieval of data requested by the host, an amount of the control data posted to the second port catch-up queue at a time being controlled by a second port catch-up threshold.

19. The storage sub-system of claim 18, wherein the first port catch-up threshold is equal to the second port catch-up threshold.

20. The storage sub-system of claim 17, further comprising:
a main memory storing the first port catch-up threshold.

21. The storage sub-system of claim 17, wherein the first port includes,
a completion queue; and
a status queue.

* * * * *